United States Patent Office 3,265,170
Patented August 9, 1966

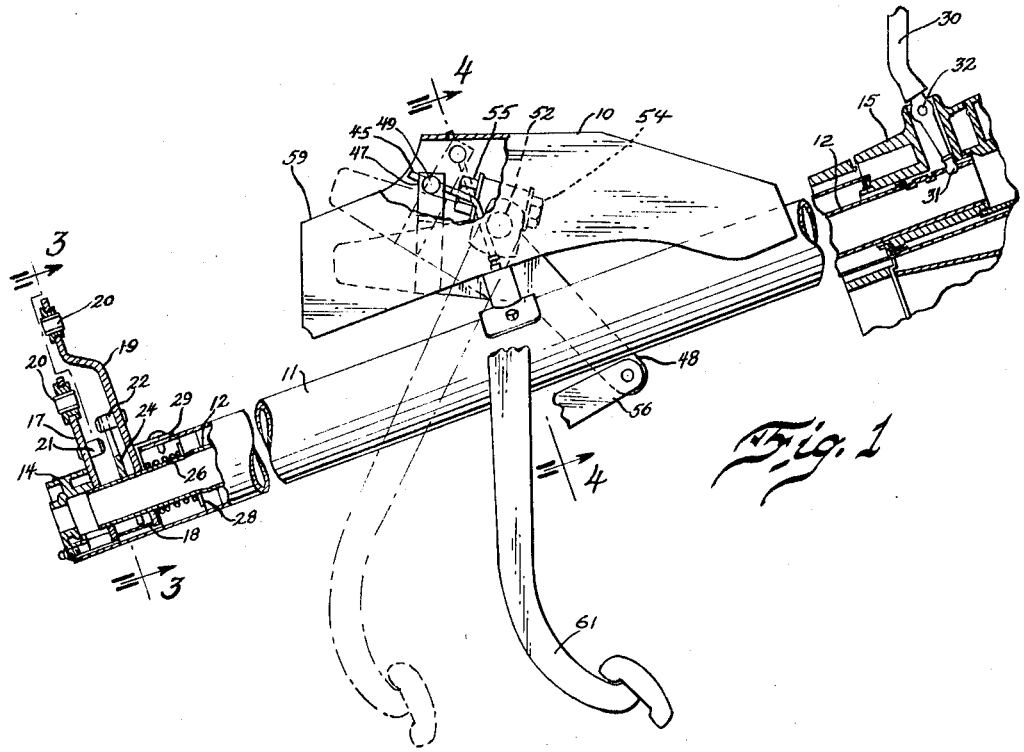
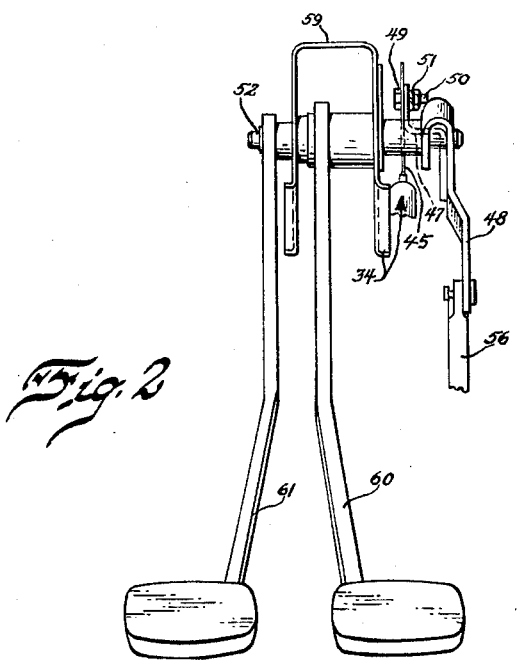

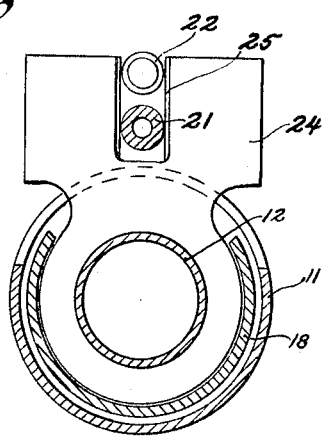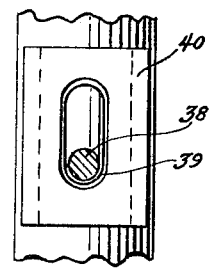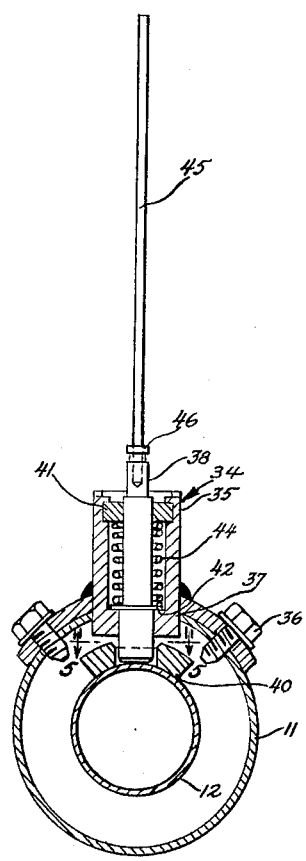

3,265,170
CLUTCH TO TRANSMISSION SHIFTING
ASSEMBLY INTERLOCK
Charles R. Olnhausen, Kenosha, Wis., assignor to American Motors Corporation, Kenosha, Wis., a corporation of Maryland
Filed Nov. 10, 1964, Ser. No. 410,237
7 Claims. (Cl. 192—3.5)

This invention relates generally to manual transmissions for vehicles and more particularly to an improvement in a clutch to transmission shifting assembly interlock to secure complete interaction of same.

Manual transmissions have been regaining popularity in recent years. Faulty performance of the necessary clutching operation while shifting into the various gears, however, has frequently resulted in damage to the gears. A common attempt to solve this problem has been to connect a movable portion of the clutch pedal linkage to a locking lever for the first and reverse gear shift lever located on the transmission housing. Completely depressing the clutch pedal and thereby disengaging the clutch proper consequently also causes movement of the locking lever which frees the shift lever for selection of first or reverse gear. Since only the first and reverse shift lever is affected, it still is possible for the vehicle operator to attempt to shift into second or third gear without proper disengagement of the clutch and thereby damage these gears.

Applicant has designed a clutch to transmission shifting assembly interlock that avoids the above noted disadvantage. The conventional steering column shifting assembly, it is to be remembered, has a shifting operating member located therein. Mounted on the lower end of the member are a pair of spaced levers. The lower lever is connected by a suitable linkage to the first and reverse gear shift lever on the transmission housing. The upper lever is similarly connected to the second and third gear shift lever on the transmission housing. The operating member, which is hollow for the passage therethrough of the steering shaft, also has the gear shift arm connected to its upper end for member actuation by the vehicle operator. When the operating member and the gear shift arm are in the neutral position with the levers aligned, the member can be moved axially to engage either lever slidably mounted thereon. Rotating the member selects the gear depending on which lever is engaged.

Applicant has utilized this neutral position by mounting a spring loaded lock on the column to engage a slot in the member. The lock on the column allows axial movement of the member but does not allow rotation to select gears unless the clutch pedal is depressed and the clutch disengaged. When the clutch pedal is depressed, a cable attached to a part of the movable clutch pedal linkage pulls the lock from engagement with the member and allows the operator to rotate the gear shift arm and the member attached thereto to select gears. When shifting to another gear, the member again passes through the neutral position where the lock again is engaged unless the clutch pedal is depressed. Thus, it is not possible to shift to any gear without depressing the clutch pedal.

From the foregoing, it is readily apparent that gear damage resulting from improper clutching while shifting gears is eliminated. In addition, this result is accomplished in an economical fashion without the necessary proliferation of parts normally required when locking the gear shift levers at the transmission housing.

It is to be understood that although the interlock is connected between the movable portion of the clutch pedal linkage and the operating member in the steering column, the interlock arrangement could also be utilized in a floor shift assembly. As with the steering column arrangement, the lock could be located to contact the gear shift lever pivot pin which is comparable to the operating member. The interlock arrangement is shown on the column because this is considered the preferred embodiment thereof.

It is, therefore, an object to provide a new and improved clutch to transmission shifting assembly interlock.

Another object is to provide a clutch to transmission shifting assembly interlock that prevents shifting from one gear to another unless the clutch pedal is fully depressed.

Another object of this invention is to provide a clutch to transmission shifting assembly interlock that secures complete interaction of same and yet is simpler, more compact and can be produced at less cost.

Other objects and advantages will become apparent from the following description in conjunction with the attached drawings in which:

FIGURE 1 is a side view partially in section of the clutch to transmission shifting assembly interlock of this invention.

FIGURE 2 is an end view with a portion removed to show the pedal mounting arrangement.

FIGURE 3 is a section along line 3—3 of FIGURE 1.
FIGURE 4 is a section along line 4—4 of FIGURE 1.
FIGURE 5 is a section along line 5—5 of FIGURE 4.

Referring to FIGURES 1, 2 and 3, 10 indicates generally a clutch to transmission shifting assembly interlock for a vehicle. Interlock 10 includes a steering column tube or housing 11. Located inside tube 11 is shifting, operating member 12. Member 12 is movably supported in tube 11 by lower bushing 14. Gear shift housing 15 also supports member 12 beyond and above tube 11. Mounted on member 12 near its lower extremity and projecting from tube 11 through an aperture therein is low and reverse lever 17. Spaced from lever 17 by spacer 18 is second and high lever 19. Levers 17 and 19 at their extremities have openings 20 therethrough for connection by means of a suitable linkage to the shifting levers located on a conventional manual transmission housing (not shown). Lever 17 has a pin 21 projecting therefrom. Pin 22 projects from lever 19 in the direction of pin 21.

Located between levers 17 and 19 and rigidly connected to member 12 is shifting gate 24. Member 12 is axially slidable in levers 17 and 19. Shifting gate 24, therefore, can contact either pin 21 or pin 22 via gate slotted opening 25 when levers 17 and 19 are aligned. Spring 26 in contact with washer 28 and locking tab 29 which is attached to tube 11 by a capscrew maintains member 12 in the neutral position with gate 24 in contact with pin 22 of second and high lever 19. At the upper end of member 12, shifting arm 30 engages a socket 31 therein. Arm 30 is pivotally mounted in gear shift housing 15 by pivot pin 32. Gear shift housing 15 is rotatable about the central axis of tube 11. Pivoting of arm 30 about pin 22 axially reciprocates member 12 in tube 11.

Located on tube 11 between gear shift housing 15 and levers 17 and 19 is lock assembly 34 which is best shown in FIGURE 4. Lock assembly 34 consists of a casing 35 mounted on tube 11 and secured thereto by capscrews 36. Casing 35 has a portion extending into the interior of tube 11 through passage 37. Interlock pin 38 located in casing 35 has one end extending therethrough and engaging slot 39 in lock plate 40 welded to member 12. Upper washer 41 is secured in casing 35 as by crimping the casing. Lower washer 42 is held in position against a shoulder of interlock pin 38 by spring 44 in contact also with anchored washer 41. Attached to the other end of interlock pin 38 by retainer 46 threaded in pin 38 is cable 45.

Cable 45 is also attached to an extension 47 of clutch pedal linkage element 48 by bolt 49, nut 50 and lockwasher 51. Element 48 is mounted on clutch pedal shaft 52 by bolt 54 and nut 55. Element 48 is also connected to the clutch pedal to bellcrank rod 56. The bellcrank and the associated linkage to the clutch proper are conventional and, therefore, are not shown. Another portion of element 48 has a clutch pedal return spring (not shown) attached thereto and which extends to bracket 59. Bracket 59 is attached to the vehicle body and also supports brake pedal 60. Clutch pedal 61 is mounted on shaft 52. The clutch pedal 61 is shown in phantom lines in FIGURE 1 as is element 48 to illustrate the clutch and interlock disengaged positions.

In operation, the vehicle engine is conventionally started with the shifting arm 30 in neutral position, or if a gear is selected, with the clutch proper disengaged. As mentioned previously, spring 26 maintains member 12 positioned axially in the neutral position so that lever 19 is engaged by gate 24 through slot 25. Selection of second or high gear, however, requires rotation of arm 30 counterclockwise and clockwise respectively from the central neutral position when the vehicle operator is in the vehicle driving position. Of course, rotation of arm 30 also rotates member 12 in tube 11 and the lever 19 through gate 24. Appropriate linkages connecting lever 19 to the associated shift lever on the transmission housing selects the second or high gear therein. For member 12 through gate 24 to engage lever 17 when in second or high gear, requires rotation of member 12 back to the central neutral position. At this point, the pins 22 and 21 and levers 17 and 19 are aligned and upward movement of arm 30 pivoting about pin 32 causes member 12, in contact with the arm, to move axially downward against spring 26. Gate 24, therefore, contacts pin 21 at slot 25 and thus engages lever 17. Rotation of arm 30 causes similar rotation of member 12 and lever 17 which through appropriate linkage connecting lever 17 to the associated shift lever on the transmission housing selects the low or reverse gear therein depending upon the direction of rotation.

Inasmuch as in moving arm 30 and thus member 12 to shift into any gear, the member 12 must be first rotated through the neutral position. Applicant has adapted member 12 to be locked therein by locking assembly 34 mounted on tube 11. Locking assembly 34 permits movement of member 12 axially for selection of lever 17 or 19 but prevents all rotation unless disengaged by movement of the clutch pedal linkage element connected thereto. Specifically, spring 44 continually urges interlock pin 38 into axially extending slot 39 in lock plate 40 welded to member 12. Member 12 may be moved axially to engage lever 17 or 19 but pin 38 prevents rotation of member 12 to select gears unless the lock is disengaged.

Disengaging of pin 38 requires depression of clutch pedal 61 against the spring attached to bracket 59 to the position shown in phantom lines in FIGURE 1. Movement of pedal 61 causes movement of pedal shaft 52. Rigidly attached to pedal shaft 52 by bolt 54 and nut 55 is element 48. The lower extremity of element 48, therefore, causes movement of the rod 56 to disengage the clutch proper. Cable 45 attached to extension 47 of element 48 by a bolt and nut combination also moves to the position shown in phantom lines and as it tightens, pulls interlock pin 38 out of slot 39. Member 12 is then free to rotate by movement of arm 30 to select the gear desired, depending on whether lever 17 or 19 is engaged. Thus, unless the clutch pedal 61 is depressed to disengage the clutch proper, no gear shifting can take place and no gear damage can occur.

Having thus described the invention, it will be apparent to those skilled in the art that various modifications and changes can be made therein without departing from the spirit of the invention or the scope of the appended claims.

I claim:

1. A vehicle clutch to transmission shifting assembly interlock comprising:
   (A) a housing defining a chamber having an entrance;
   (B) support means for said housing;
   (C) an operating member movably supported in said housing chamber, said member having a slot therein, said member having a portion thereof extending outside said housing;
   (D) a pair of spaced levers mounted on said operating member outside said housing, said operating member being slidable in said levers and selectively engageable for rotation therewith, said levers also being adapted to select gears in a manual transmission;
   (E) a locking member having one end extending through said housing entrance and engaging said slot, said locking member being adapted to contact and be restrained by said housing;
   (F) a clutch pedal linkage element connected to said other end of said locking member, said linkage element being adapted to pull said locking member out of engagement with said slot when the clutch pedal is depressed to disengage the clutch and thereby free for rotation said operating member to rotate the selected lever to select the desired transmission gear.

2. A vehicle clutch to transmission shifting assembly interlock comprising:
   (A) a housing defining a chamber having an entrance;
   (B) support means for said housing;
   (C) an operating member movably supported in said housing chamber, said member having a slot therein;
   (D) a pair of spaced levers mounted on said operating member, said operating member being slidable in said levers and selectively engageable for rotation therewith, said levers also extending outside said housing and being adapted to select gears in a manual transmission;
   (E) a locking member having one end extending through said housing entrance and engaging said slot, said member being adapted to contact and be restrained by said housing;
   (F) a clutch pedal linkage element connected to said other end of said locking member, said linkage element being adapted to pull said locking member out of engagement with said slot when the clutch pedal is depressed to disengage the clutch and thereby free for rotation said operating member to rotate the selected lever to select the desired transmission gear.

3. A vehicle clutch to transmission shifting assembly interlock comprising:
   (A) a housing defining a chamber having an entrance;
   (B) support means for said housing;
   (C) an operating member movably supported in said housing chamber, said member having a slot therein;
   (D) a pair of spaced levers mounted on said operating member, said operating member being slidable in said levers and selectively engageable for rotation therewith, said levers also extending outside said housing and being adapted to select gears in a manual transmission;
   (E) a locking member having one end extending through said housing entrance and engaging said slot, said locking member being adapted to contact and be restrained by said housing;
   (F) link means connected to said other end of said locking member;

(G) a clutch pedal linkage element connected to said link means, said linkage element being adapted to pull said link means to move the locking member connected thereto out of engagement with said slot when the clutch pedal is depressed to disengage the clutch, said operating member thereby being free for rotation to rotate the selected lever to select the desired transmission gear.

4. The device of claim 3 further comprising: spring means to maintain said locking member in said slot to prevent rotation of said operating member and the engaged, selected lever until said clutch pedal is depressed.

5. A vehicle clutch to transmission shifting assembly interlock comprising:
(A) a housing defining a chamber having an entrance;
(B) support means for said housing;
(C) an operating member movably supported in said housing chamber, said member having a slot therein;
(D) a pair of spaced levers mounted on said operating member, said operating member being slidable in said levers and selectively engageable for rotation therewith, said levers also extending outside said housing and being adapted to select gears in a manual transmission;
(E) locking means to prevent rotation of said operating member in said housing, said locking means comprising a hollow casing mounted on said housing over said entrance, an interlock pin movably located in said casing and having one end extending through said entrance and engaging said slot and the other end extending outside said casing, and a spring located in said casing and surrounding said pin to resiliently secure said pin therein;
(F) link means connected to said other end of said interlock pin;
(G) a clutch pedal linkage element connected to said link means, said linkage element being adapted to pull said link means to move the interlock pin out of engagement with said slot against said spring when the clutch pedal is depressed to disengage said clutch, said operating member thereby being free for rotation to rotate the selected lever to select the desired transmission gear.

6. The device of claim 5 in which the link means is made of a flexible cable.

7. The device of claim 6 further comprising: a shifting arm pivotally mounted in said housing, one portion extending outward therefrom and the other portion engaging said operating member, said arm upon actuation being adapted to reciprocate and rotate said operating member in said housing to select said lever and rotate same to select the desired transmission gear.

References Cited by the Examiner
UNITED STATES PATENTS
3,106,996  10/1963  Morris et al. _____ 192–3.5

DAVID J. WILLIAMOWSKY, *Primary Examiner.*
ARTHUR T. McKEON, *Examiner.*